United States Patent
Lee et al.

(10) Patent No.: US 10,813,098 B2
(45) Date of Patent: Oct. 20, 2020

(54) METHOD FOR TRANSMISSION AND RECEPTION IN WIRELESS COMMUNICATION SYSTEM, AND APPARATUS THEREFOR

(71) Applicant: LG Electronics Inc., Seoul (KR)

(72) Inventors: Hyunho Lee, Seoul (KR); Seungmin Lee, Seoul (KR); Yunjung Yi, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 16/316,732

(22) PCT Filed: Jun. 30, 2017

(86) PCT No.: PCT/KR2017/006944
§ 371 (c)(1),
(2) Date: Jan. 10, 2019

(87) PCT Pub. No.: WO2018/012774
PCT Pub. Date: Jan. 18, 2018

(65) Prior Publication Data
US 2019/0246387 A1    Aug. 8, 2019

Related U.S. Application Data

(60) Provisional application No. 62/411,621, filed on Oct. 23, 2016, provisional application No. 62/362,596, filed on Jul. 15, 2016.

(51) Int. Cl.
*H04W 72/04* (2009.01)
*H04L 5/00* (2006.01)

(52) U.S. Cl.
CPC ............ *H04W 72/046* (2013.01); *H04L 5/00* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2010/0099428 A1* | 4/2010 | Bhushan | H04J 11/0059 455/452.1 |
| 2012/0026956 A1* | 2/2012 | Benjebbour | H04W 16/12 370/329 |

(Continued)

FOREIGN PATENT DOCUMENTS

| KR | 1020150105710 | 9/2015 |
| KR | 1020150136128 | 12/2015 |

OTHER PUBLICATIONS

PCT International Search Report and Written Opinion in International Appln. No. PCT/KR2017/006944, dated Nov. 2, 2017, 24 pages.

*Primary Examiner* — Jutai Kao
(74) *Attorney, Agent, or Firm* — Fish & Richardson P.C.

(57) ABSTRACT

A method for transmission and reception for a terminal in a wireless communication system according to an embodiment of the present invention may comprises the steps of: receiving group information of a serving cell and neighboring cells and uplink/downlink configuration information for each group; and transmitting or receiving a signal to or from the serving cell, using the received group information of the serving cell and the neighboring cells and the uplink/downlink configuration information for each group, wherein the group information includes information on groups of cells clustered according to beams to be used by each cell or beam groups to which the beams belong.

20 Claims, 9 Drawing Sheets

(56) References Cited

U.S. PATENT DOCUMENTS

| | | |
|---|---|---|
| 2013/0242812 A1 | 9/2013 | Khoryaev et al. |
| 2014/0307591 A1 | 10/2014 | Wang et al. |
| 2015/0365957 A1* | 12/2015 | Zhu .................. H04L 5/0092 370/280 |
| 2016/0219570 A1* | 7/2016 | Guo ................... H04W 72/042 |
| 2019/0165983 A1* | 5/2019 | Nakayama .......... H04W 72/046 |

* cited by examiner

METHOD FOR TRANSMISSION AND RECEPTION IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/006944, filed on Jun. 30, 2017, which claims the benefit of U.S. Provisional Application No. 62/411,621, filed on Oct. 23, 2016, and U.S. Provisional Application No. 62/362,596, filed on Jul. 15, 2016. The disclosures of the prior applications are incorporated by reference in their entirety.

TECHNICAL FIELD

The present invention relates to a wireless communication system and, more particularly, to a transmission and reception method in a wireless communication system and an apparatus therefor.

BACKGROUND ART

As more communication devices have demanded higher communication capacity, there has been necessity of enhanced mobile broadband (eMBB) communication as compared with legacy radio access technology (RAT). In addition, massive machine type communication (MTC) for providing various services anytime and anywhere by connecting a plurality of devices and objects to each other is also one main issue to be considered in next-generation communication. Moreover, a communication system to be designed in consideration of services/UEs sensitive to reliability and latency is under discussion. Thus, the introduction of next-generation RAT has been discussed by taking into consideration eMBB communication, massive MTC (mMTC), ultra-reliable and low-latency communication (URLLC), and the like. In the present invention, the above technology is referred to as new RAT.

DISCLOSURE OF THE INVENTION

Technical Problem

The present invention provides a transmission and reception method through flexible resource configuration in a wireless communication system and an operation related thereto.

The objects that can be achieved with the present invention are not limited to what has been particularly described hereinabove and other objects not described herein will be more clearly understood by persons skilled in the art from the following detailed description.

Technical Solution

To achieve these and other advantages and in accordance with the purpose of the present invention, as embodied and broadly described, according to one embodiment, a method for transmission and reception for a terminal in a wireless communication system includes receiving group information of a serving cell and a neighboring cell and uplink/downlink configuration information for each group; and transmitting or receiving a signal to/from the serving cell using the received group information of the serving cell and the neighboring cell and the uplink/downlink configuration information for each group, wherein the group information includes information regarding a cell group which is clustered according to a beam to be used by each cell or a beam group to which the beam belongs.

Additionally or alternatively, the uplink/downlink configuration information can indicate how at least a part of a downlink region, an uplink region and a guard period region is configured in a predetermined time period or a subframe.

Additionally or alternatively, the uplink/downlink configuration information can be dynamically or semi-statically changed in a unit of a predetermined time period.

Additionally or alternatively, the uplink/downlink configuration information for each group can be determined in consideration of uplink/downlink configuration information of a different group.

Additionally or alternatively, the uplink/downlink configuration information can include information regarding a guard period region configured for a specific time resource, a specific frequency resource or a specific beam resource configured in a cell belonging to a corresponding group.

Additionally or alternatively, the information regarding the guard period region can include a length of the guard period region, the maximum range of the guard period region, or the maximum value of the guard period region.

Additionally or alternatively, the uplink/downlink configuration information can include information regarding a downlink and/or uplink portion configured for a specific time resource, a specific frequency resource or a specific beam resource configured in a cell belonging to a corresponding group.

Additionally or alternatively, a predetermined time resource, a predetermined frequency resource, or a predetermined beam resource indicated by the uplink/downlink configuration information for each group, can be fixed to one of a downlink region, an uplink region, and a guard period region.

Additionally or alternatively, a predetermined time resource, a predetermined frequency resource, or a predetermined beam resource indicated by the uplink/downlink configuration information for each group can be configured to use a same TTI, a same TTI length, or a same subcarrier spacing.

Additionally or alternatively, the method can further include performing channel measurement in the predetermined time resource, the predetermined frequency resource, or the predetermined beam resource.

To further achieve these and other advantages and in accordance with the purpose of the present invention, according to a different embodiment, a terminal for transmission and reception in a wireless communication system includes a transmitter and a receiver; and a processor configured to control the transmitter and the receiver, wherein the processor is configured to receive group information of a serving cell and a neighboring cell and uplink/downlink configuration information for each group; and to transmit or receive signal to/from the serving cell using the received group information of the serving cell and the neighboring cell and the uplink/downlink configuration information for each group, wherein the group information includes information regarding a cell group which is clustered according to a beam to be used by each cell or a beam group to which the beam belongs.

Additionally or alternatively, the uplink/downlink configuration information can indicate how at least a part of a downlink region, an uplink region and a guard period region is configured in a predetermined time period or a subframe.

Additionally or alternatively, the uplink/downlink configuration information can be dynamically or semi-statically changed in a unit of a predetermined time period.

Additionally or alternatively, the uplink/downlink configuration information for each group can be determined in consideration of uplink/downlink configuration information of a different group.

Additionally or alternatively, the uplink/downlink configuration information can include information regarding a guard period region configured for a specific time resource, a specific frequency resource or a specific beam resource configured in a cell belonging to a corresponding group.

Additionally or alternatively, the information regarding the guard period region can include a length of the guard period region, the maximum range of the guard period region, or the maximum value of the guard period region.

Additionally or alternatively, the uplink/downlink configuration information can include information regarding a downlink and/or uplink portion configured for a specific time resource, a specific frequency resource or a specific beam resource configured in a cell belonging to a corresponding group.

Additionally or alternatively, a predetermined time resource, a predetermined frequency resource, or a predetermined beam resource indicated by the uplink/downlink configuration information for each group, is fixed to one of a downlink region, an uplink region, and a guard period region.

Additionally or alternatively, a predetermined time resource, a predetermined frequency resource, or a predetermined beam resource indicated by the uplink/downlink configuration information for each group is configured to use a same TTI, a same TTI length, or a same subcarrier spacing.

Additionally or alternatively, the processor can be configured to perform channel measurement in the predetermined time resource, the predetermined frequency resource, or the predetermined beam resource.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to an embodiment of the present invention, transmission or reception in a wireless communication system can be efficiently performed.

The effects that can be achieved with the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the present invention, and are incorporated in and constitute a part of this specification, illustrate embodiments of the invention and together with the description serve to explain the principles of the invention.

BEST MODE

Figure 1:
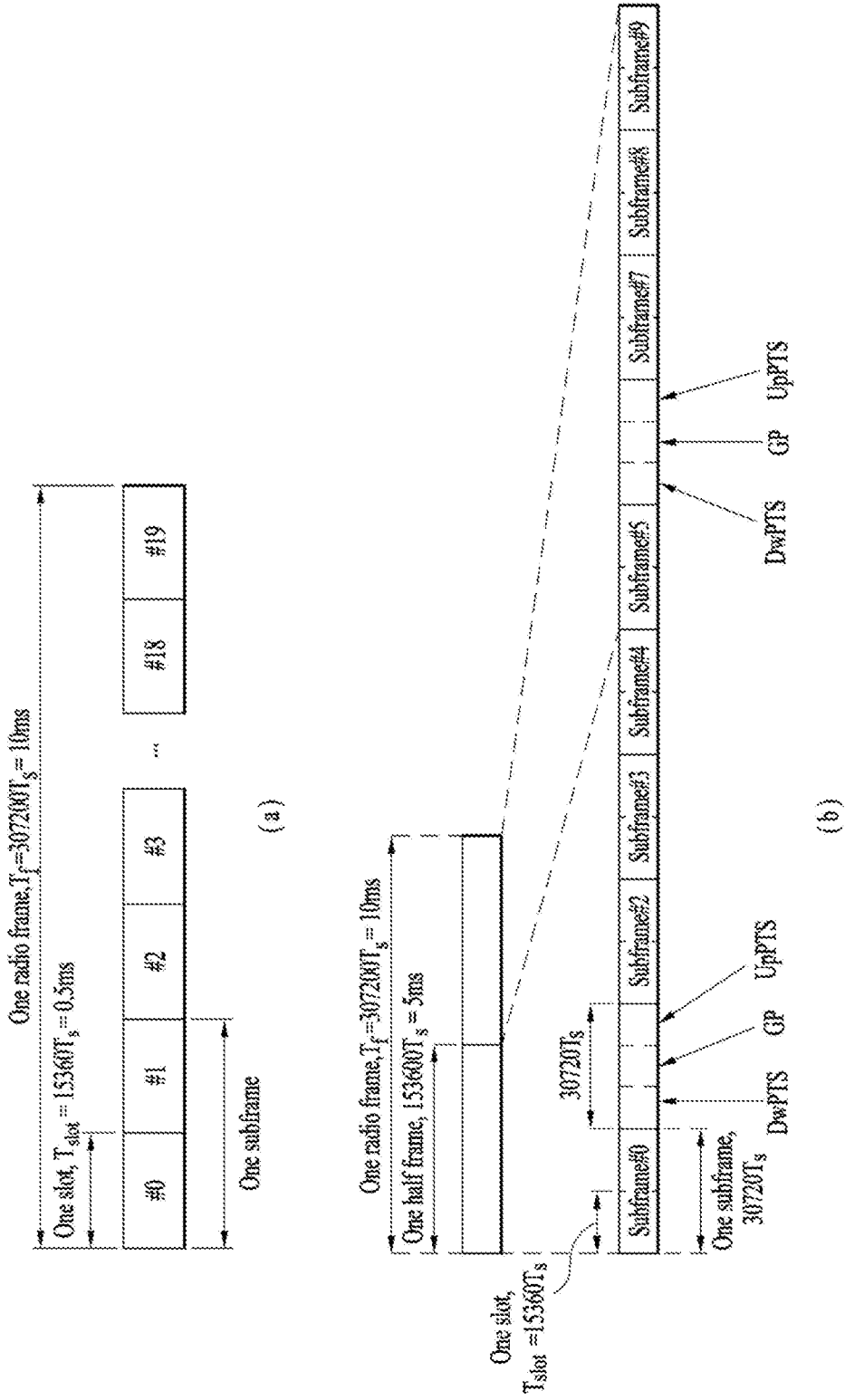
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. ABS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
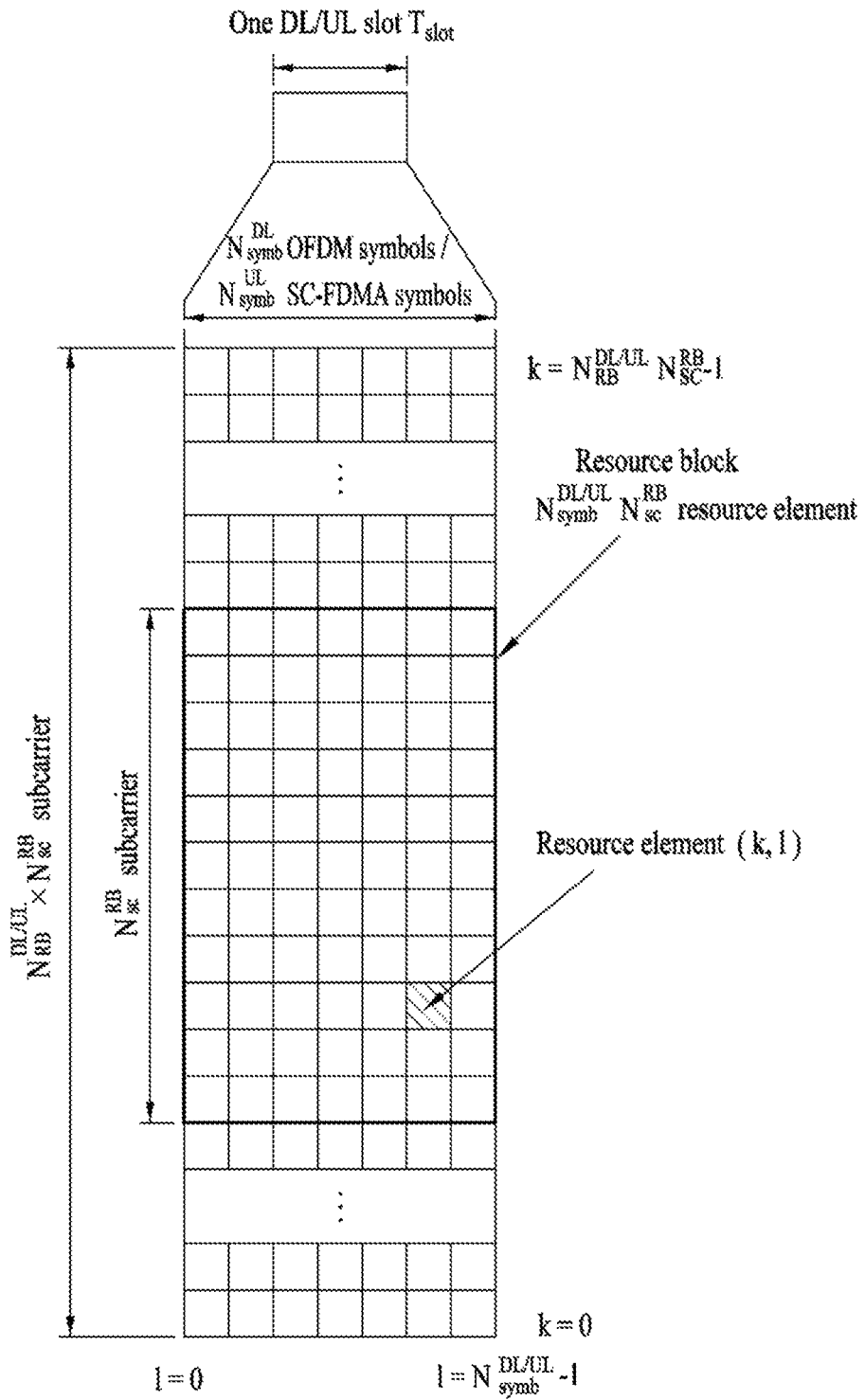
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
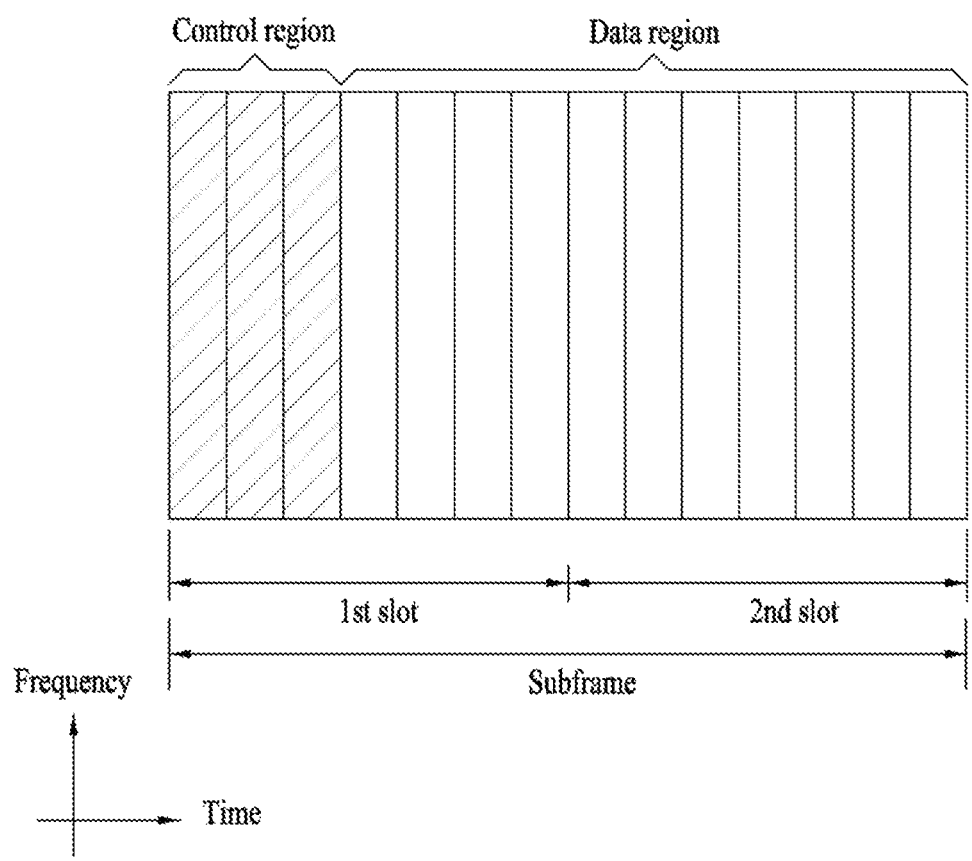
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
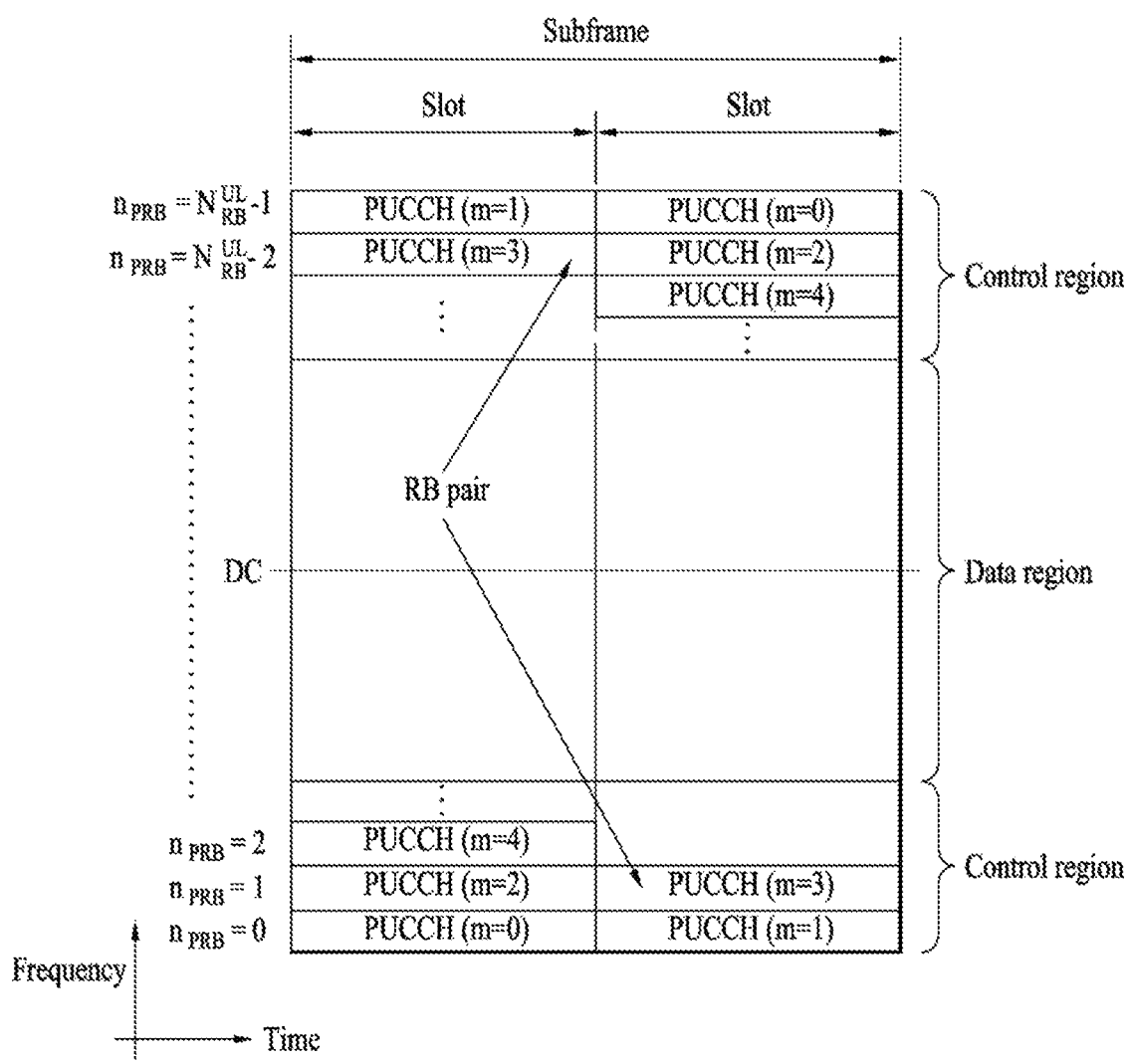
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

[Self-Contained Subframe Structure]

Figure 5:
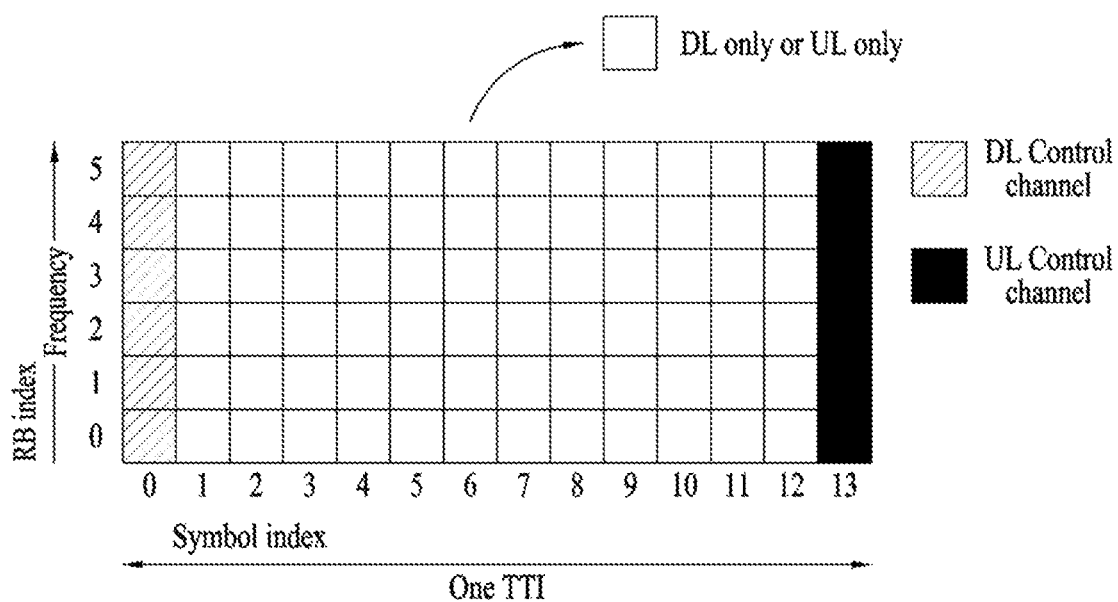
FIG. 5 illustrates a self-contained subframe structure.

For the purpose of minimizing latency in 5th-generation (5G) new RAT, a structure in which a control channel and a data channel are time-division-multiplexed (TDMed) as illustrated in FIG. 5 may be considered as one frame structure.

In FIG. 5, a hatched region represents a DL control region and a black region represents a UL control region. An unmarked region may be used for DL data transmission or UL data transmission. This structure is characterized in that DL transmission and UL transmission are sequentially performed in one subframe so that DL data may be transmitted and a UL ACK/NACK signal may be received in the subframe. As a result, the time taken to retransmit data when a data transmission error occurs may be reduced, thereby minimizing the latency of final data transmission.

In such a subframe structure in which the data channel and the control channel are TDMed, a time gap is needed for the process of switching from a transmission mode to a reception mode or from the reception mode to the transmission mode of the eNB and UE. To this end, some OFDM symbols at the time of switching from DL to UL in the subframe structure are configured as a guard period (GP).

[Analog Beamforming]

In millimeter wave (mmW), wavelength is shortened and thus a plurality of antennas may be installed in the same area. That is, a total of 100 antenna elements may be installed in a panel of 5-by-5 cm in a 30-GHz band with a wavelength of about 1 cm in a 2-dimensional array at intervals of 0.5λ (wavelength). Therefore, in mmW, increasing coverage or throughput by increasing beamforming (BF) gain using multiple antenna elements is taken into consideration.

If a transceiver unit (TXRU) is provided for each antenna element to enable adjustment of transmission power and phase, independent BF may be performed for each frequency resource. However, installing TXRUs in all of about 100 antenna elements is less feasible in terms of cost. Therefore, a method of mapping a plurality of antenna elements to one TXRU and adjusting the direction of a beam using an analog phase shifter is considered. This analog BF method may make only one beam direction in the whole band and thus may not perform frequency selective BF, which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of connection of B TXRUs and Q antenna elements.

[RRM Measurement in LTE]

LTE system supports an RRM operation including power control, scheduling, cell search, cell reselection, handover, radio link or connection monitoring, connection establish/re-establish, and the like. In this case, a service cell may ask a terminal to transmit RRM measurement information corresponding to a measurement value for performing the RRM operation. As a representative example, the terminal can measure information such as cell search information on each cell, RSRP, RSRQ, and the like and report the information to the serving cell in LTE system. Specifically, the terminal receives "measConfig" from the serving cell as a higher layer signal for RRM measurement in LTE system. The terminal measures RSRP or RSRQ based on information of the "measConfig". In this case, the RSRP and the RSRQ according to LTE system can be defined as follows.

[RSRP]

The RSRP is defined as the linear average over the power contributions (in [W]) of the resource elements that carry cell-specific reference signals within the considered measurement frequency bandwidth. In order to determine the RSRP, the cell-specific reference signals R0 shall be used. If a terminal is able to reliably detect that R1 is available, it may use use R1 in addition to R0 to determine RSRP.

The reference point for the RSRP shall be the antenna connector of the terminal. If receiver diversity is in use by the terminal, the reported value shall not be lower than the corresponding RSRP of any of the individual diversity branches.

[RSRQ]

Reference Signal Received Quality (RSRQ) is defined as N*RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE. If receiver diversity is in use by the UE, the reported value shall not be lower than the corresponding RSRQ of any of the individual diversity branches.

[RSSI]

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

According to the definition above, when a terminal operating in the LTE system performs intra-frequency measurement, the terminal is allowed to measure RSRP on a bandwidth corresponding to one of 6, 15, 25, 50, 75, and 100 RBs (resource blocks) through an allowed measurement bandwidth-related IE transmitted in SIB3 (system information block type 3). When the terminal performs inter-frequency measurement, the terminal is allowed to measure RSRP on a bandwidth corresponding to one of 6, 15, 25, 50, 75, and 100 RBs through an allowed measurement bandwidth transmitted in SIB5. If the IE does not exist, the terminal can measure RSRP on a frequency band of the entire DL system by default. In this case, when the terminal receives an allowed measurement bandwidth, the terminal considers a value of the allowed measurement bandwidth as the maximum measurement bandwidth and can freely measure RSRP within the value. However, when a serving cell transmits IE defined as WB-RSRQ and configures an allowed measurement bandwidth to be equal to or greater than 50 RBs, it is necessary for the terminal to calculate an RSRP value for the entire allowed measurement bandwidth. Meanwhile, RSSI is measured on a frequency band of a receiver of a terminal in accordance with a definition of an RSSI bandwidth.

The present invention proposes a method of mitigating inter-cell interference in a network in which an operation of dynamically changing a DL resource and a UL resource is performed. The DL resource and the UL resource correspond to a resource used by a base station to transmit a signal to a terminal and a resource used by the terminal to transmit a signal to the base station, respectively. When a specific cell divides the entire time/frequency resources into DL resources and UL resources, the operation of dynamically changing a DL resource and a UL resource corresponds to an operation of dynamically changing the resources in accordance with the amount of DL traffic and the amount of UL traffic to be served on a specific moment. It is able to designate a method of dividing the entire time/frequency resources into DL resources and UL resources during specific time and the method can be signaled to a terminal. This can be referred to as a designation of UL/DL resource configuration.

Figure 6:
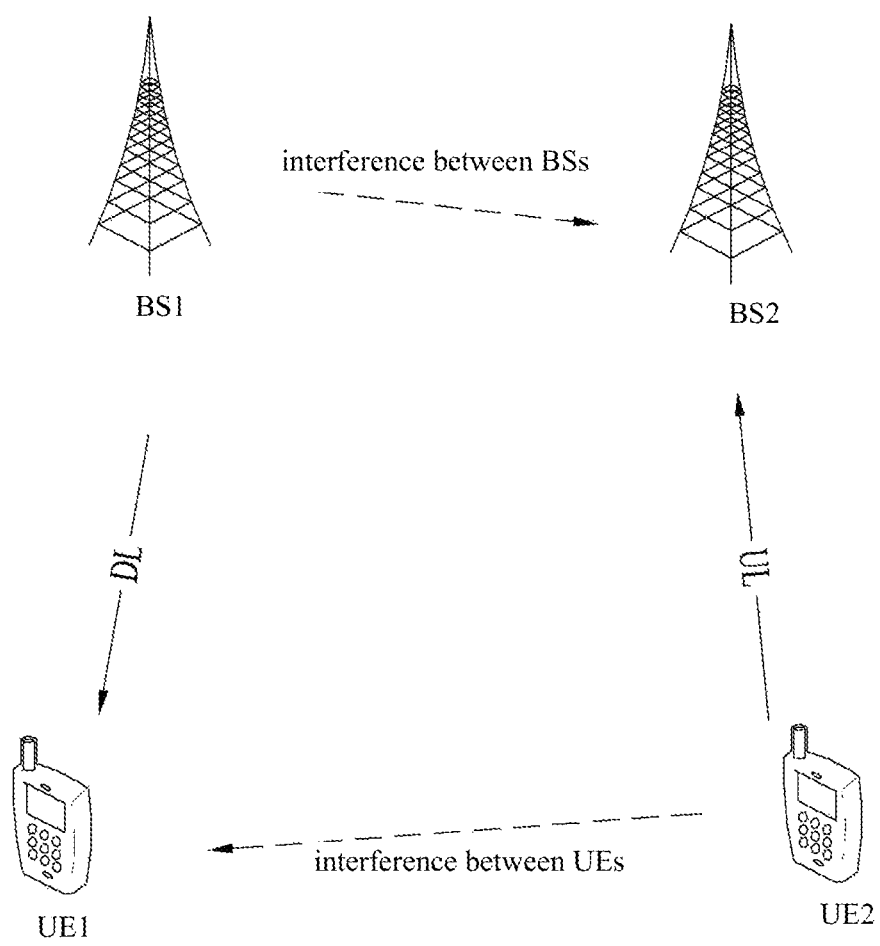
FIG. 6 illustrates interference between base stations and interference between terminals.

When two cells adjacent to each other use a different UL/DL resource configuration, it may cause a serious interference problem. For example, as illustrated in FIG. 6, when an eNB1 performs downlink transmission using a specific time/frequency resource, if an eNB2 adjacent to the eNB1 receives an uplink signal of a UE in the same resource, since a transmission signal of the eNB1 acts as strong interference on reception of the eNB2, a successful signal reception rate becomes very low. When a UE1 and a UE2 are positioned at an adjacent position and the UE2 performs uplink transmission, if the UE1 receives a downlink signal of the eNB1 in the same resource, since a transmission signal of the UE2 acts as interference on reception of the UE1, a successful signal reception rate can be lowered.

As a different usage case of the present invention, the present invention proposes a method of mitigating inter-cell interference in a network in which an operation of dynamically changing numerology is performed. In this case, the numerology may correspond to a time interval (e.g., TTI (transmission time interval) length, etc.) corresponding to the basic of transmission time or subcarrier spacing. For example, when two cells positioned at an adjacent position transmit a DL signal in the same time/frequency resource using different subcarrier spacing, if a terminal fails to cancel an interference cell signal or interference changes, DL reception performance of the terminal can be deteriorated.

Inter-Cell Coordination and Related Signaling

As a method of mitigating interference between eNBs, eNBs positioned within a short distance are clustered as a group (i.e., clustering) and it may be able to make eNBs belonging to the same group use the same UL/DL resource configuration. More specifically, when an eNB uses an analog beam or the like, the eNB may belong to one or more groups and a configuration of a group may vary depending on analog beam direction used by each of eNBs. For example, when a cell A configures the k number of beams ranging from b1 to bk, a group for a beam may vary or beams for a group may vary. In particular, a DL/UL configuration usable for a specific time and/or frequency resource (e.g., a subframe) may vary based on a beam (or a beam group). A cell can select an intended DL/UL configuration to be applied based on a beam (or a beam group) to be used by the cell. For example, assume that a cell A belongs to clusters C1, C2, and C3, beams belonging to the C1 correspond to {b1, b2}, beams belonging to the C2 correspond to {b3, b4, bk−3}, and beams belonging to the C3 correspond to {bk−2, bk−1, bk}. In this case, when an intended DL/UL configuration of the C1 corresponds to DL:GP:UL=1:1:12, an intended DL/UL configuration of the C2 corresponds to 6:2:6, and an intended DL/UL configuration of the C3 corresponds to 12:1:1, in order to transmit direction of b4, assume that a structure of 6:2:6 is used. In order to determine a beam (or beam group)-specific intended UL/DL configuration for a specific time resource and/or a specific frequency resource, traffic load information regarding a specific time resource and/or a specific frequency resource and/or a specific beam resource of an eNB can be exchanged via backhaul signaling between eNBs.

Moreover, clustering of eNBs can be performed by at least one of a network core and eNBs. In particular, the clustering according to the present invention may have a centralized type or a distributed type.

In case of the centralized type clustering, an eNB receives a channel measurement result (e.g., channel status report, etc.) from serving UEs. If it is determined that the eNB provides a different eNB with interference equal to or greater than a certain level based on the result, the eNB may ask a network core to change a cluster (group). Similarly, in case of the distributed type clustering, an eNB receives a channel measurement result (e.g., channel status report, etc.) from serving UEs. If it is determined that the eNB provides a different eNB with interference equal to or greater than a certain level based on the result, the eNB may ask an eNB, which has performed clustering, to change a cluster (group).

Figure 7:
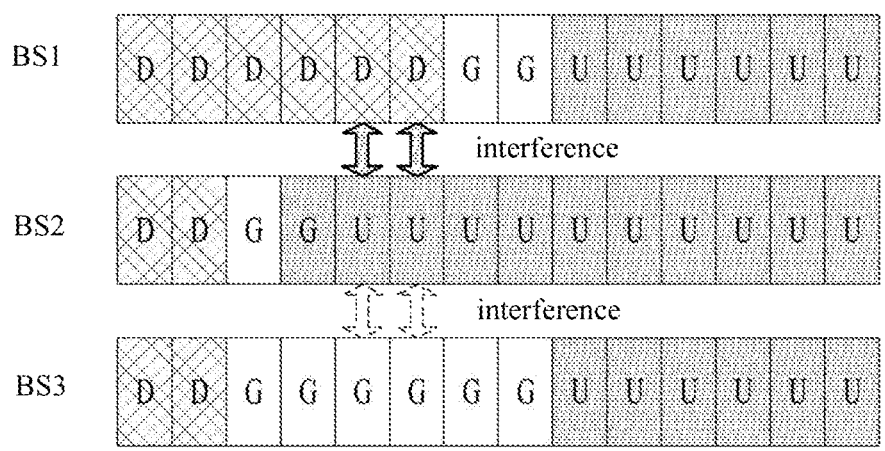
FIG. 7 illustrates uplink/downlink configuration according to a base station.

However, since all eNBs belonging to a group do not have the same DL/UL traffic amount, it may be preferable to enable efficient communication to be performed via more flexible UL/DL resource configuration. For example, as illustrated in FIG. 7, when DL traffic is heavy for a specific beam direction of the eNB1, a portion of DL/GP/UL is configured by 6:2:6. When DL traffic is relatively less, the portion of DL/GP/UL can be changed with 2:6:6. In this case, although all or a part of resources configured as a GP by the eNB1 is configured by UL, the eNB2 positioned within a short distance from the eNB1 can receive a signal without interference from the eNB1. On the contrary, it may change a portion of a GP and UL according to the amount of UL traffic and a neighboring eNB can configure all or a part of resources configured as a GP by DL.

In addition, an intended configuration of DL/GP/UL capable of being used in each cluster (group) is dynamically or semi-statically configured in every subframe or in a unit of multiple subframes and it may consider flexibility described in the following.

Parts corresponding to D and G of the intended configuration are changed with U or G Part corresponding to G of the intended configuration is changed with D Part corresponding to U of the intended configuration is changed with G or low power D In order to mitigate the aforementioned inter-cell interference, information regarding a resource configuration can be exchanged between eNBs via backhaul signaling. A UL/DL resource configuration to be used by a specific eNB can be dynamically or semi-statically determined in consideration of the information. Specifically, the information regarding the resource configuration can include GP information to be configured for a specific time resource and/or a specific frequency resource and/or a specific beam resource by a specific eNB. In this case, the GP information can include information regarding a time resource and/or a frequency resource to be configured as a GP within the specific time resource and/or the specific frequency resource and/or the specific beam resource, information regarding a GP length, and the like. Or, the information regarding the resource configuration may include the maximum range of a GP to be configured within a specific time resource and/or a specific frequency resource and/or a specific beam resource by a specific eNB or the maximum value of a GP length.

The information regarding the resource configuration may include information regarding a DL portion and/or a UL portion to be configured within a specific time resource and/or a specific frequency resource and/or a specific beam resource by a specific eNB. For example, the information regarding the resource configuration can include a PDSCH starting/ending symbol index to be configured within a specific time resource and/or a specific frequency resource and/or a specific beam resource by a specific eNB and/or a UL control symbol length, and the like. Or, the information regarding the resource configuration can include information corresponding to the maximum range of a DL portion and/or a UL portion to be configured within a specific time resource and/or a specific frequency resource and/or a specific beam resource by a specific eNB.

Assistance Information for Cancelling UE-to-UE Interference

It is able to provide the aforementioned "information regarding the resource configuration" of an adjacent (neighboring) eNB to a terminal. For example, an advanced terminal is able to approximately identify a resource from which UE-to-UE interference is originated by utilizing the information. Hence, the advanced terminal may attempt to perform such an operation as interference cancellation through the information when a DL signal is received. Or, when a neighboring cell dynamically changes a region of DL burst or UL burst, it may affect decoding and interference measurement of a terminal. When a terminal intends to cancel data of an interference cell without assistance information of a network, it may be able to inform the terminal of information regarding whether a burst length used in the interference cell is configured dynamically or semi-statically. Or, it may be able to provide the terminal with a burst length, candidate(s) of a bust length, or information regarding a burst length. A change of a DL burst can be restricted to a structure described in the following.

A length of a DL burst can be restricted to $x\_1, x\_2, \ldots, x\_n$. For example, n may correspond to 3 and it may set a limit on the n to prevent complexity of blind decoding (BD) of a terminal from being considerably increased.

For example, a structure between DL burst lengths can be restricted to a nested structure such as $x\_\{k\}=2^\{k\}*x\_\{k+1\}$ ($k=1, 2, \ldots, n-1$).

In the structure above, a terminal can perform BD to determine whether or not an interference cell performs transmission in every symbol or according to a DL burst length candidate. For example, in order to increase reliability of BD, a DM-RS pattern may vary depending on a length of a transmitted DL burst. Or, scrambling can be performed on a DM-RS.

Or, DM-RS transmission is assumed for the smallest DL burst length $x\_n$. When a DL burst length increases, it may assume a form that transmission of a DM-RS is repeated. In particular, a terminal performs a basic unit of interference cancellation on the smallest $x\_n$ of a DL burst and can repeatedly perform the basic unit of interference cancellation within a subframe several times.

A similar concept can be applied to a UL burst as well. In particular, a change of a UL burst can be restricted to a structure described in the following.

A length of a UL burst can be restricted to $x\_1, x\_2, \ldots, x\_n$. For example, n may correspond to 3 and it may set a limit on the n to prevent complexity of blind decoding (BD) of a terminal from being considerably increased.

For example, a structure between UL burst lengths can be restricted to a nested structure such as $x\_\{k\}=2^\{k\}*x\_\{k+1\}$ ($k=1, 2, \ldots, n-1$).

In the structure above, a terminal can perform BD to determine whether or not an interference cell performs transmission in every symbol or according to a UL burst length candidate. For example, in order to increase reliability of BD, a DM-RS pattern may vary depending on a length of a transmitted UL burst. Or, scrambling can be performed on a DM-RS.

Or, DM-RS transmission is assumed for the smallest UL burst length $x\_n$. When a DL burst length increases, it may assume a form that transmission of a DM-RS is repeated. In particular, a terminal performs a basic unit of interference cancellation on the smallest $x\_n$ of a UL burst and can repeatedly perform the basic unit of interference cancellation within a subframe several times.

"Inter-Cell Coordination and Related Signaling" Associated with Clustering

In order to mitigate inter-cell interference, it may set a limit on a specific time/frequency resource to make all eNBs participating in coordination use the specific time/frequency resource as a fixed usage among DL/UL/Guard. For example, it may be able to define a rule that all eNBs participating in coordination configure a specific time/frequency resource as a guard period in order not to transmit/receive a signal. And, it may be able to configure all eNBs participating in coordination to use the same numerology for a specific time/frequency resource. In this case, the same numerology may correspond to the same TTI (or TTI length) and/or the same subcarrier spacing.

When a specific time/frequency resource is restricted to be used as a fixed usage such as a DL/UL/Guard usage and/or the same numerology is configured to be used, the restriction information is exchanged between eNBs and UE scheduling can be performed by utilizing the restriction information. And, it may be able to provide the "restriction information" of a neighboring eNB to a terminal.

When the terminal receives DL data, receives DL control, or transmits UL control using the restriction information, it may be able to define a rule that the terminal performs such an operation as cancellation on an interference signal having the same usage and/or the same numerology only. When D2D (device-to-device) communication such as sidelink and the like are set to a resource fixed as a guard period usage, a terminal may assume that the terminal is able to transmit a signal with high power without any restriction on a DL/UL resource in the resource. Or, the guard period can be fixed by a backhaul link. In this case, the maximum value of transmit power used for sidelink or the like can be configured by a different value irrespective of a resource configured as sidelink in a DL/UL resource.

And, it may be able to define a rule that specific measurement of the terminal is to be performed in the time/frequency resource of the fixed usage only. Specifically, it may be able to define a rule that the terminal performs such a measurement as RSSI/RSRQ on a time/frequency resource configured to be used by a neighboring eNB in DL only. Or, it may be able to define a rule that the terminal performs interference measurement for calculating CSI on a time/frequency resource configured to be used by a neighboring eNB in DL only, a specific resource (e.g., IMR) within a corresponding resource only, or a newly defined resource for measuring interference only. The above-mentioned classification can also be implemented by separating restricted measurement sets configured by a network from each other. For example, two or more restricted measurement sets can be configured in a manner of being divided into resources classified as DL by all neighboring cells, resources capable of being flexibly used in DL and UL, and the like. This means that it is able not only to configure a frequency region, but also to divide timing.

Moreover, when the interference measurement is performed, an interference measurement target resource may vary depending on numerology. In particular, an interference measurement target resource can be configured according to numerology. For example, an interference measurement resource set 1 is configured for a case of using numerology of 15 kHz carrier spacing, and/or an interference measurement resource set 2 is configured for a case of using numerology of 30 kHz carrier spacing, and/or an interference measurement resource set 3 is configured for a case of using numerology of 60 kHz carrier spacing. A terminal performs measurement on a configured interference measurement resource set and can report a result of the measurement to an eNB or a system. The eNB or the system may be able to use the reported measurement result in scheduling a terminal.

Signaling Information Regarding Numerology and/or Service Type

It may be able to exchange information regarding numerology and/or a service type via backhaul signaling between eNBs to mitigate inter-cell interference, In this case, the service type may indicate the usage of traffic such as eMBB/URLLC/mMTC. eNBs (or coordinators in a centralized type network) participating in coordination can be scheduled to avoid a collision as much as possible in a specific resource of a different numerology/service type using the backhaul signaling.

Or, it may be able to configure a priority for a specific time/frequency resource according to a beam, a service type, or a numerology set and information regarding the priority can be exchanged via backhaul signaling. For example, when a specific eNB configures such a priority as URLLC>eMBB>mMTC for a specific time/frequency resource, neighboring eNBs determines that DL or UL communication to which high transmit power of a URLLC type is set can be scheduled to the resource with a relatively higher probability. The neighboring eNBs can perform scheduling using the same numerology used for the URLLC or may empty out without performing scheduling. Moreover, a resource (time/frequency) intended according to a numerology set can be configured according to a cell/eNB and information regarding the resource can be exchanged via backhaul signaling between eNBs. A neighboring cell can transmit a corresponding configuration using the same numerology. In case of using a different numerology, it may perform muting. Information regarding the resource configuration can also be transmitted to the terminal. When a resource is interpreted as a resource capable of cancelling interference or a resource capable of protecting MCS, power control, and the like, it may consider applying on the basis of the resource. For example, a higher MCS level or high power can be used for the resource.

Signaling Interference Cancellation Capability of Terminal

It may be able to define a rule that a terminal transmits capability signaling to a network to inform the network of information regarding whether or not the terminal has capability capable of cancelling a signal having different numerology. Similarly, it may be able to define a rule that the terminal transmits capability signaling to the network to inform the network of information regarding whether or not the terminal has capability capable of cancelling a signal having a different waveform. For example, when the terminal uses an OFDM symbol in UL, if an SC-FDMA symbol is used as an interference signal, it may be able to define a rule that the terminal transmits capability signaling to the network to inform the network of information regarding whether or not the terminal has capability capable of cancelling the SC-FDMA symbol. When the interference is cancelled, it may be able to separately signal a bandwidth capable of handling an interference signal. And, the terminal can transmit performance signaling to the network to inform the network of information regarding the number of numerologies different from each other (or the number of interference cells) capable of being cancelled.

Reference Signal-Related

As mentioned in the foregoing description, when an eNB is able to perform flexible resource configuration, an RS location can be flexibly defined as well. In this case, it may be preferable to perform scheduling in the direction of minimizing inter-cell interference that affects an RS.

As a method, it may be able to define a rule that a time and/or frequency resource to which an RS is mapped within a specific channel is to be fixed to a predefined (signaled) specific location. Information regarding the resource to which the RS is mapped can be exchanged via backhaul signaling between eNBs. Specifically, a symbol index to which an RS is mapped within a specific channel can be always fixed by an $x^{th}$ symbol(s) within the channel. For example, x may corresponds to 1, a first few symbols positioned at the foremost of the channel, a few symbols positioned at the center of the channel, or a few symbols positioned at the last of the channel.

Or, as mentioned in the foregoing description, when it is assumed that a length of a DL burst/UL burst increases in a nested form, if a DM-RS pattern of the smallest burst length increases, it is able to assume that the DM-RS pattern has a fixed pattern in a repeated form.

More generally, a different DM-RS pattern can be configured in advance according to a burst length.

When a UL burst length is dynamically changed in TDD, a general method of defining a DM-RS pattern is described in the following. In this case, when the UL burst length is dynamically changed, it can be interpreted as a starting position and an ending position of the UL burst are (dynamically or semi-statically) changeable.

A DM-RS is mapped to an OFDM symbol index irrespective of a start position and an ending position of a UL burst. When an OFDM symbol is not used as a UL burst, puncturing is assumed.

In this case, a DM-RS pattern is selected by a length of a UL burst, is determined by duration of the last OFDM symbol index (capable of transmitting a UL burst) in a starting OFDM symbol index, or can be selected by unconditionally assuming a subframe.

A DM-RS pattern is mapped under the assumption that a start point of a UL bust corresponds to the first OFDM symbol in the aspect of a symbol to which a DM-RS is mapped. In this case, an OFDM symbol index at which a DM-RS is transmitted can be changed according to the start point of the UL burst.

In this case, a DM-RS pattern is selected by a length of a UL burst, is determined by duration of the last OFDM symbol index (capable of transmitting a UL burst) in a starting OFDM symbol index, or can be selected by unconditionally assuming a subframe.

A DM-RS pattern is mapped from an end point of a UL burst. In this case, assume that the end point of the UL burst corresponds to the last OFDM symbol index of a DM-RS mapping symbol.

In this case, a DM-RS pattern is selected by a length of a UL burst, is determined by duration of the last OFDM symbol index (capable of transmitting a UL burst) in a starting OFDM symbol index, or can be selected by unconditionally assuming a subframe.

A DM-RS pattern to be mapped is determined according to a region to which a DM-RS is to be mapped, is dynamically signaled, or can be configured via higher layer signaling.

More generally, in order to protect a relatively important signal (e.g., a control channel, a DM-RS, etc.) from inter-cell interference as much as possible, it may be able to define a rule that a position of the signal is to be fixed at a predefined or a signaled specific location. For example, although a portion of a DL/UL channel configured by an eNB is flexibly changed, it may be able to reduce DL transmit power of the eNB or avoid DL transmission to make interference, which is anticipated to affect a UL reception signal of a neighboring eNB, to be equal to or less than a certain level for a symbol to which a UL RS of the neighboring eNB is mapped. As a different example, since UL reception of the eNB is affected by a DL transmission signal of the neighboring eNB for the symbol to which the DL RS of the neighboring eNB is mapped, the eNB can indicate a terminal to increase UL transmit power of the eNB. As a further different example, it may be able to define a rule that at least a service having different numerology is not scheduled to a symbol to which an RS is mapped in an adjacent cell.

As a different method, candidate information regarding a resource to which an important signal (e.g., a control channel, a DM-RS, etc.) is mapped within a specific channel can be exchanged via backhaul signaling between eNBs. In this case, the important signal or the resource to which the signal is mapped can be referred to as a protect resource having a higher priority or a protect resource of a higher priority.

Signaling Additional Information Regarding Important Signal

A cell can indicate DL/UL direction for a resource to which an important signal (e.g., a control channel, a DM-RS, etc.) is mapped within a specific channel, used numerology, and the like. Information regarding the resource to which the important signal is mapped, DL/UL direction in the resource, and the used numerology can be exchanged between cells via backhaul signaling. It may recommend a different cell to use the same DL/UL direction and the same numerology for the resource. It may recommend a different cell to use transmit power equal to or less than a predetermined size only (determined in advance or configured/indicated by higher/physical layer signaling) for the resource.

A cell can configure DL/UL direction, used numerology, and the like for a resource to be protected according to a usage scenario. Information regarding a specific resource, DL/UL direction in the resource, and information regarding used numerology can be exchanged between cells via backhaul signaling. It may recommend a different cell not to schedule traffic for a different usage scenario to the resource. It may recommend a different cell to use transmit power equal to or less than a predetermined size only (determined in advance or configured/indicated by higher/physical layer signaling) for the resource. Protection on a resource for eMBB DL/UL UCI can be requested and it may be able to configure scheduling of a different usage scenario such as URLCC, sidelink, mMTC, and the like to be avoided for the resource. This is intended to minimize interference between different usage scenarios having different power, a different TTI length, different subcarrier spacing, and the like.

Base Unit of Signaling for Providing Information

When specific information is exchanged between cells via backhaul signaling, the information can be exchanged according to a resource on the basis of default numerology or reference numerology. For example, the default numerology can be configured by subcarrier spacing of 15 kHz. Or, the information can be exchanged according to a numerology unit different from the default numerology/reference numerology. Specifically, the information can be exchanged in a unit of a slot or a mini/sub-slot. In this case, the specific information can include intended DL/UL direction, beam information, used numerology, service type, power-related information, priority of a specific resource (e.g., information regarding whether the resource is used as an RS, control, or data), and the like.

The specific information can be added in addition to information based on the reference numerology. Or, the specific information can be replaced with the information based on the reference numerology. When the specific information is added, such an option as signaling or bitmap can be configured as follows.

(Option 1) A bitmap can be configured by binding a subframe index and a slot index together. For example, when an ICIC message is exchanged via a backhaul link in a unit of 40 msec and 8 slots are transmitted within 1 msec under the assumption of 60 kHz, transmission can be performed through 320 bits in total.

(Option 2) A bitmap for a subframe index is mapped, mapping for an internal slot index is separately transmitted, and mapping for slots can be applied to each subframe. In this case, when backhaul signaling is transmitted in a unit of 40 msec, 40 bits are used for a subframe index, and 8 slots are transmitted within 1 msec under the assumption of 60 kHz, it may be able to transmit 48 bits in total. Although the option 2 reduces signaling overhead, each of slots does not support a different structure according to a subframe.

(Option 3) A bitmap for a subframe index is mapped and mapping for a slot index can be commonly applied within time corresponding to the specific number of subframes. For example, when backhaul signaling is transmitted in a unit of 40 msec, 40 bits are used for a subframe index, and a common structure is configured in a unit of 10 subframes under the assumption of 60 kHz, it may be able to transmit 72 bits in total with 4*8 slots (per 1 msec)=32 bits.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information regarding whether to apply the proposed methods (information regarding rules of the proposed methods) via a predefined signal (e.g., physical layer signal or upper layer signal).

Figure 8:
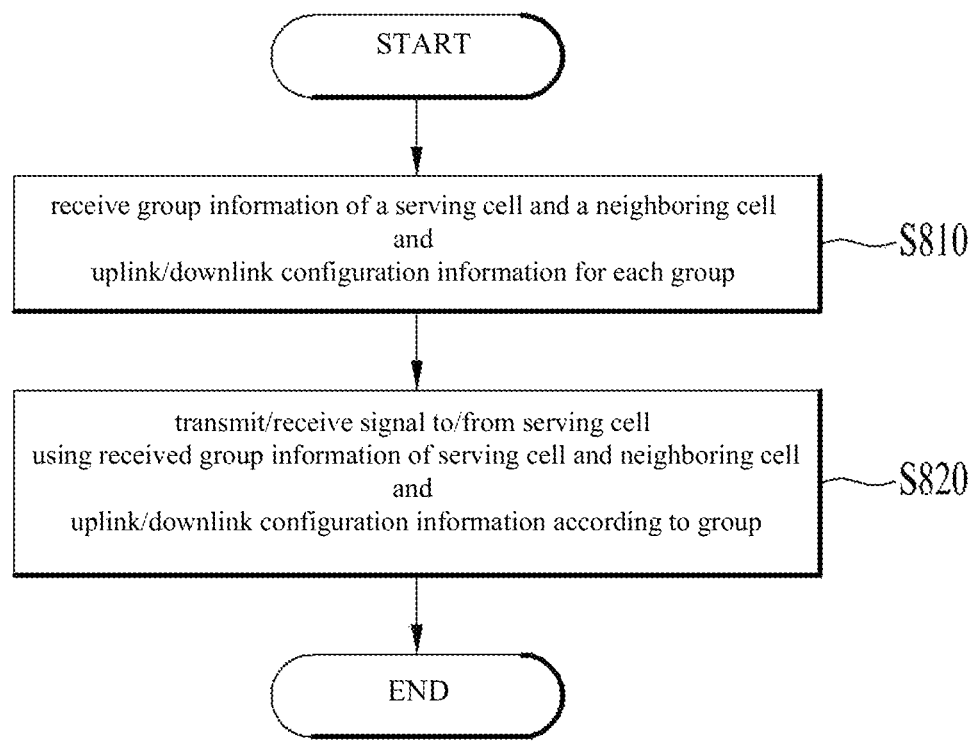
FIG. 8 illustrates an operation of a terminal.

FIG. 8 illustrates an operation of a terminal.

A method of transmitting and receiving a signal for a terminal in a wireless communication system according to one embodiment of the present invention is described. A terminal can receive group information of a serving cell and a neighboring cell and uplink/downlink configuration information for each group [S810]. The terminal can transmit/receive a signal to/from the serving cell using the group information of the serving cell and the neighboring cell and the uplink/downlink configuration information for each group [S820]. The group information can include information regarding a cell group which is clustered according to a beam to be used by each cell or a beam group to which the beam belongs.

The uplink/downlink configuration information can indicate how at least a part of a downlink region, an uplink region and a guard period region is configured in a predetermined time period or a subframe.

The uplink/downlink configuration information can be dynamically or semi-statically changed in a unit of a predetermined time period.

The uplink/downlink configuration information for each group can be determined in consideration of uplink/downlink configuration information according to a different group.

The uplink/downlink configuration information can include information regarding a guard period region configured for a specific time resource, a specific frequency resource or a specific beam resource configured in a cell belonging to a corresponding group. The information regarding the guard period region can include a length of the guard period region, the maximum range of the guard period region, and the maximum value of the guard period region.

The uplink/downlink configuration information can include information regarding a downlink and/or uplink portion configured for a specific time resource, a specific frequency resource or a specific beam resource configured in a cell belonging to a corresponding group.

A predetermined time resource, a predetermined frequency resource, or a predetermined beam resource indicated by the uplink/downlink configuration information for each group, can be fixed to one of a downlink region, an uplink region, and a guard period region.

The predetermined time resource, the predetermined frequency resource, or the predetermined beam resource, which is indicated by the uplink/downlink configuration information for each group, can be configured to use the same TTI, the same TTI length, or the same subcarrier spacing.

The terminal can perform channel measurement in the predetermined time resource, the predetermined frequency resource, or the predetermined beam resource.

In the foregoing description, embodiments of the present invention have been briefly explained with reference to FIG. 8. An embodiment related to FIG. 8 can alternatively or additionally include at least a part of the aforementioned embodiments.

Figure 9:
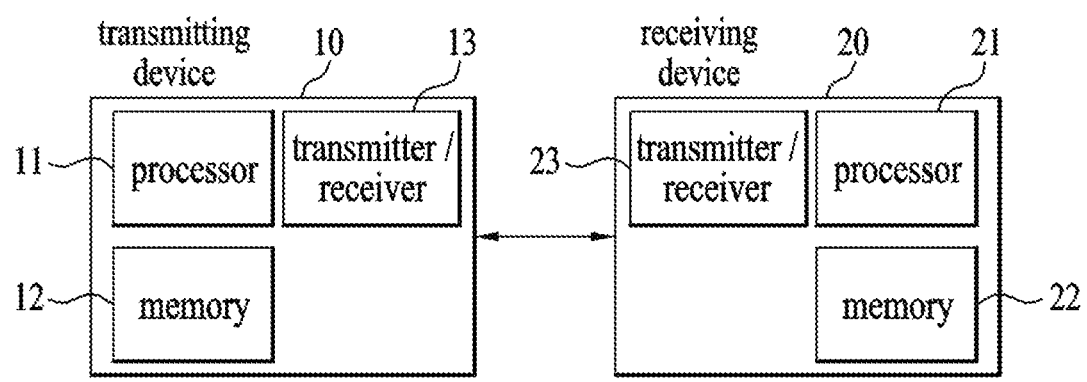
FIG. 9 is a block diagram of a device for implementing embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method for transmission and reception for a terminal in a wireless communication system, the method comprising:
   receiving group information of a serving cell and a neighboring cell and uplink/downlink configuration information for each group; and
   transmitting or receiving a signal to/from the serving cell using the received group information of the serving cell and the neighboring cell and the uplink/downlink configuration information for each group,
   wherein the group information includes information regarding a cell group which is clustered according to a beam to be used by each cell or a beam group to which the beam belongs.

2. The method of claim 1, wherein the uplink/downlink configuration information indicates how at least a part of a downlink region, an uplink region and a guard period region is configured in a predetermined time period or a subframe.

3. The method of claim 1, wherein the uplink/downlink configuration information is dynamically or semi-statically changed in a unit of a predetermined time period.

4. The method of claim 1, wherein the uplink/downlink configuration information for each group is determined in consideration of uplink/downlink configuration information of a different group.

5. The method of claim 1, wherein the uplink/downlink configuration information includes information regarding a guard period region configured for a specific time resource, a specific frequency resource or a specific beam resource configured in a cell belonging to a corresponding group.

6. The method of claim 5, wherein the information regarding the guard period region includes a length of the guard period region, the maximum range of the guard period region, or a maximum value of the guard period region.

7. The method of claim 1, wherein the uplink/downlink configuration information includes information regarding a downlink and/or uplink portion configured for a specific time resource, a specific frequency resource or a specific beam resource configured in a cell belonging to a corresponding group.

8. The method of claim 1, wherein a predetermined time resource, a predetermined frequency resource, or a predetermined beam resource indicated by the uplink/downlink configuration information for each group, is fixed to one of a downlink region, an uplink region, and a guard period region.

9. The method of claim 8, further comprising:
   performing channel measurement in the predetermined time resource, the predetermined frequency resource, or the predetermined beam resource.

10. The method of claim 1, wherein a predetermined time resource, a predetermined frequency resource, or a predetermined beam resource indicated by the uplink/downlink configuration information for each group is configured to use a same TTI, a same TTI length, or a same subcarrier spacing.

11. A terminal performing transmission and reception in a wireless communication system, comprising:
a transmitter and a receiver; and
a processor configured to control the transmitter and the receiver,
wherein the processor is configured to:
receive group information of a serving cell and a neighboring cell and uplink/downlink configuration information for each group; and
transmit or receive signal to/from the serving cell using the received group information of the serving cell and the neighboring cell and the uplink/downlink configuration information for each group,
wherein the group information includes information regarding a cell group which is clustered according to a beam to be used by each cell or a beam group to which the beam belongs.

12. The terminal of claim 11, wherein the uplink/downlink configuration information indicates how at least a part of a downlink region, an uplink region and a guard period region is configured in a predetermined time period or a subframe.

13. The terminal of claim 11, wherein the uplink/downlink configuration information is dynamically or semi-statically changed in a unit of a predetermined time period.

14. The terminal of claim 11, wherein the uplink/downlink configuration information for each group is determined in consideration of uplink/downlink configuration information of a different group.

15. The terminal of claim 11, wherein the uplink/downlink configuration information includes information regarding a guard period region configured for a specific time resource, a specific frequency resource or a specific beam resource configured in a cell belonging to a corresponding group.

16. The terminal of claim 15, wherein the information regarding the guard period region includes a length of the guard period region, the maximum range of the guard period region, or a maximum value of the guard period region.

17. The terminal of claim 11, wherein the uplink/downlink configuration information includes information regarding a downlink and/or uplink portion configured for a specific time resource, a specific frequency resource or a specific beam resource configured in a cell belonging to a corresponding group.

18. The terminal of claim 11, wherein a predetermined time resource, a predetermined frequency resource, or a predetermined beam resource indicated by the uplink/downlink configuration information for each group, is fixed to one of a downlink region, an uplink region, and a guard period region.

19. The terminal of claim 18, wherein the processor is configured to perform channel measurement in the predetermined time, the predetermined frequency resource, or the predetermined beam resource.

20. The terminal of claim 11, wherein a predetermined time resource, a predetermined frequency resource, or a predetermined beam resource indicated by the uplink/downlink configuration information for each group is configured to use a same TTI, a same TTI length, or a same subcarrier spacing.

* * * * *